United States Patent [19]

Reinhall

[11] Patent Number: 4,801,099

[45] Date of Patent: Jan. 31, 1989

[54] COMBINED HYDROSTATIC/HYDRODYNAMIC BEARING SYSTEM FOR GRINDING APPARATUS

[76] Inventor: Rolf B. Reinhall, 834 171st Pl., N.E., Bellevue, Wash. 98008

[21] Appl. No.: 647,412

[22] Filed: Sep. 5, 1984

[51] Int. Cl.⁴ .................................................. B02C 7/14

[52] U.S. Cl. ................................ 241/101.2; 241/259.2

[58] Field of Search ............. 241/37, 63, 101.2, 101.3; 384/107, 111, 112, 114, 121

[56] References Cited

U.S. PATENT DOCUMENTS

| | | | |
|---|---|---|---|
| 2,947,485 | 8/1960 | Woodruff et al. | 241/37 X |
| 3,115,372 | 12/1963 | Bard | 384/107 |
| 3,212,721 | 10/1965 | Asplund et al. | 241/37 |
| 3,600,747 | 8/1971 | McCarty | 241/37 X |
| 3,700,293 | 10/1972 | Dray | 384/125 |
| 3,806,208 | 4/1974 | Bruck | 384/107 |
| 3,961,757 | 6/1976 | Berggren | 241/37 X |
| 4,402,463 | 9/1983 | Kahmann et al. | 241/259.2 X |

*Primary Examiner*—Howard N. Goldberg
*Assistant Examiner*—Joseph M. Gorski
*Attorney, Agent, or Firm*—Eric Y. Munson

[57] ABSTRACT

Combined hydrostatic/hydrodynamic bearing system for a grinding apparatus in which the material is ground in a grinding space defined between a pair of relatively rotating grinding members and in which at least one of the grinding members is carried by an axially displaceable rotatable shaft. One or more cylindrical pistons are mounted on the rotatable shaft to rotate therewith within a pressure chamber defined within a stationary cylindrical housing permitting the piston or pistons to be displaced axially therein. Fluctuations in axial thrust forces acting on the displaceable rotatable shaft are counteracted by applying a fluid pressure medium to one or both of the piston ends of the cylindrical piston or pistons in a controlled manner so as to maintain a predetermined clearance range of the grinding space.

17 Claims, 6 Drawing Sheets

10
11
12
20
22
23
24
25
26
27
32
42
52
53
54
55
56
58
59
62
63
64
100
101
110
112

26
24
120
32
71
56
112
110
31
54
34B
34C
33
30
36C
36A
70
38
27

26
24
32
71
56
112
110
31
54
34B
34C
33
30
36C
36A
70
38
27

36
32
30
34
24
120
10
55

32
30
36
120
34
24
10
55

36
120
34
30
32
24
10
55

32
30
30
32
120
24
10
55

COMBINED HYDROSTATIC/HYDRODYNAMIC BEARING SYSTEM FOR GRINDING APPARATUS

BACKGROUND OF THE INVENTION

The present invention relates to improvements in grinding apparatus or attrition mill, which include a pair of facially opposed, axially adjustable and relatively rotating grinding members defining therebetween a grinding space into which the raw material is passed, and during which passage substantial moments of axial thrust forces are generated opposing the means provided for maintaining the desired grinding clearance between the grinding members.

The invention relates more particularly to a rotating disc type grinding apparatus for refining paper pulp and the like usages, in which the pulp material to be ground or otherwise treated is passed into a grinding space defined between a pair of relatively axially adjustable grinding discs which rotate relative to one another in a plane perpendicular to their axes. At least one of the pair of discs is displaceable axially and is mounted on a rotating shaft which is free to move axially with the displaceable grinding member in response to pressure forces acting thereon. The pulp material, which may consist of wood chips, bagasse, fiber suspensions or similar material, is fed into the central portion of the grinding space, through which it is radially accelerated by the effect of the centrifugal force generated by the rotary movement of the discs. The resultant grist is ejected from the grinding space upon completion of the grinding operation, through a peripheral gap between the discs into a surrounding housing.

The axial movement or "float" of the rotating shaft is controlled to maintain the predetermined grinding clearance ranges between the discs, which clearance varies, depending on the particular application of the grinding apparatus. For instance, in conventional pulp refiners, the usual disc separation is between 0.1 mm. and 1 mm., whereas, in the application of the apparatus to waste paper (asphalt dispersion), the separation may be as much as 2.5 mm. In other applications, the discs may be spaced apart as little as 0.05 mm.

Pulp refining apparatus of the type described are generally exemplified by my U.S. Pat. Nos. 4,082,233, 4,253,233, 4,283,016 and 4,378,092.

The rapid acceleration of the material through the narrow grinding space generates axial thrust forces which tend to urge the discs away from one another and thus widen the grinding clearance, with consequent severe impairment of the efficiency of the apparatus.

If the grinding apparatus or attrition mill is operated as part of a closed and pressurized system for treating a fluid slurry, for example, in addition to the axial thrust forces acting on the discs, additional power must be imparted to the driving means, not only to drive the discs so as to achieve the desired attrition or grinding work, but also to drive the discs against the fluid friction or hydraulic drag forces acting on them, thus further adding to the axial load variations on the rotating shaft.

It should be understood that, unless these forces are effectively counteracted, the apparatus would break down or be rendered useless.

It should also be understood that the resistance to these thrust forces increases tremendously as the diameter of the discs increases.

Because of the growing demand for large capacity refining systems, which call for large diameter grinding discs, such as on the order of 150 cm. or larger, the absorption of these axial thrust forces has become an increasingly accentuated problem.

Late developments involve refiners having a diameter of 165 cm.–170 cm., with a rotational speed of 1500 r.p.m.–3600 r.p.m., capable of a power input of 15,000 kw.–40,000 kw.

For a better understanding of the tremendous axial loads or thrust forces imposed on the rotating shaft, let us assume that a 150 cm. diameter disc rotating at 1800 r.p.m. will generate a centrifugal force corresponding to about 2800 g's accelerating the grist through the grinding space, which centrifugal force will impose an axial load on the shaft of about 100 tons, to be absorbed by the bearing construction. Now, if the speed of the grinding disc is doubled, i.e. increased to 3600 r.p.m. the centrifugal force will be increased by a factor of 4, according to Newton's law of force and motion. Thus, the centrifugal force will be increased to 11,200 g's, which might increase the axial load on the rotating shaft to the order of 200–300 tons. These abnormally heavy axial loads have to be distributed over a complicated bearing system requiring a multiplicity of bearings and servo motors, with consequent increase in dimensions and cost of manufacture of the apparatus.

An example of a bearing construction of the above mentioned type is disclosed in my U.S. Pat. No. 3,717,308, issued Feb. 20, 1973, on an application originally filed July 5, 1969. This patent discloses and claims a bearing system with combined axial and radial thrust bearings supporting the rotating shaft, each bearing being connected to a servo motor for absorbing the axial thrust forces imposed upon the rotating shaft. Other examples of bearing constructions heretofore used are disclosed in my U.S. Pat. No. 4,118,800, issued Oct. 3, 1978, U.S. Pat. No. 3,212,721 to Asplund et al, issued Oct. 19, 1965, U.S. Pat. No. 4,073,442 to Nils G. Virving, dated Feb. 14, 1978, and U.S. Pat. No. 3,276,701, issued to Sprout Waldron & Co., Inc., assignee of Chester Donald Fisher, dated Oct. 4, 1966.

U.S. Pat. No. 4,402,463, issued Sept. 6, 1983, to Escher Wyss GmbH, assignee of Albrecht Kahmann et al, suggests another solution of the problem discussed herein.

Common to the prior art references is the fact that the hydraulic pistons in the servo motors for the thrust bearings are non-rotating.

SUMMARY OF THE INVENTION

My present invention purports to solve the problem of absorbing these heavy axial thrust forces by replacing the expensive and complicated thrust bearings and associated servo motors by a combined hydrostatic/hydrodynamic bearing system including one or more cylinder pistons mounted on the rotatable shaft to rotate therewith within a pressure chamber defined within a stationary cylindrical housing permitting the piston or pistons to be displaced axially therein in response to changes in pressure caused by fluctuations in axial thrust forces acting on the rotatable displaceable grinding member. The invention provides means for applying a fluid pressure medium to at least one of the piston ends to generate a hydrostatic stabilizing force on the rotating shaft in an axial direction in a controlled manner, so as to constantly counteract fluctuating axial thrust forces acting on the displaceable rotating shaft and to maintain a predetermined clearance range of the grinding space while generating a hydrodynamic stabilizing force on the rotating shaft in a radial direction.

BRIEF DESCRIPTION OF THE DISCLOSURE

DETAILED DESCRIPTION OF THE INVENTION

Figure 1:
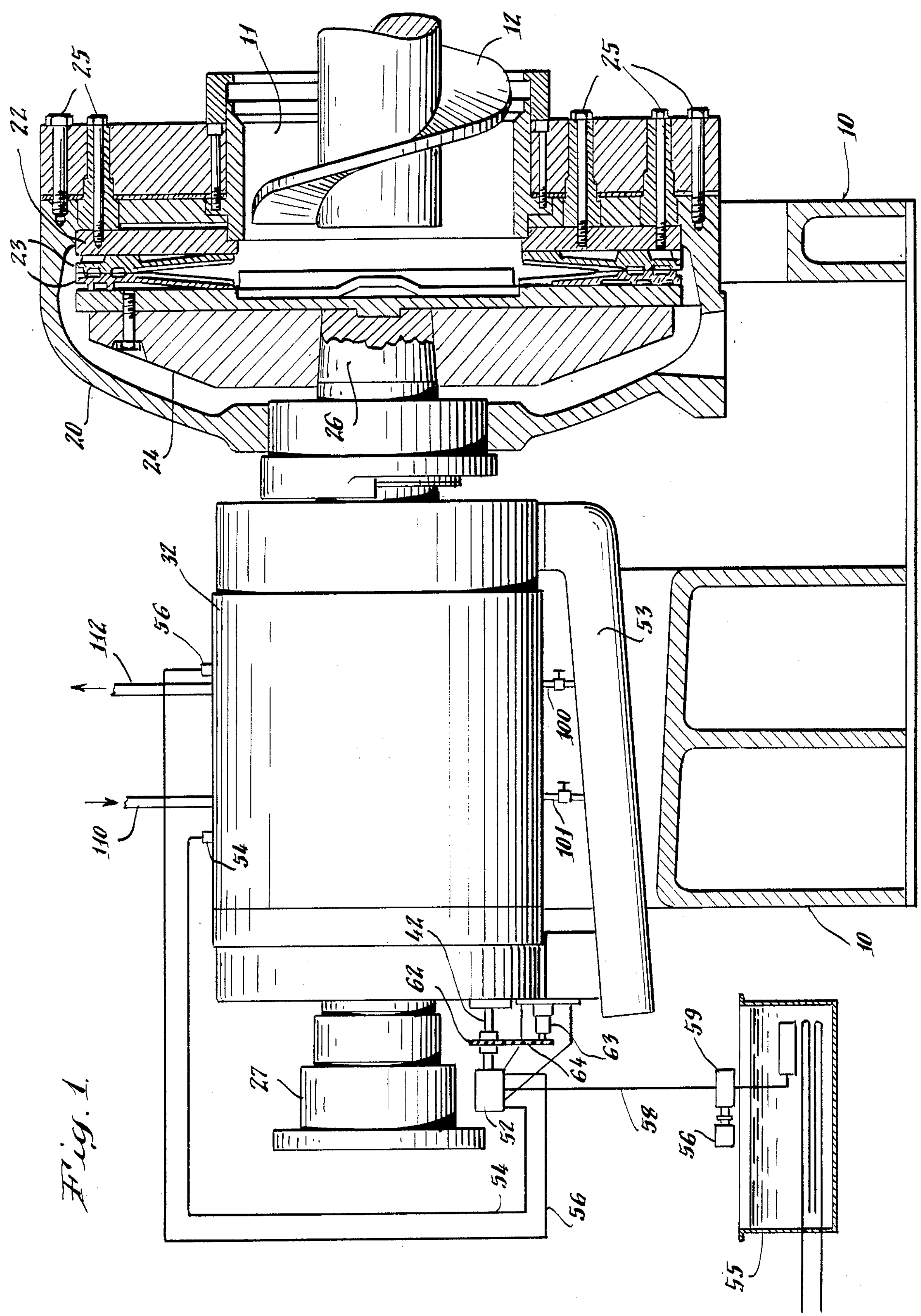
FIG. 1 is a partial front elevational view of a grinding apparatus partly in section embodying the invention.

Referring to FIGS. 1–4, in which the same reference numerals serve to indicate same or analagous parts, reference number 10 designates the frame in which an axially displaceable shaft 26 is journalled in two bearing members 34 and 36. One end 27 of the shaft 26 is adapted to be driven by a motor (not shown). The other end of the shaft 26 carries the rotating adjustable disc 24, which, together with the stationary disc 22, defines a grinding space therebetween. Both discs are provided with conventional grinding segments 23.

The grinding discs are enclosed within a casing 20, to which the stationary disc 22 is mounted by bolt connections 25. The raw material is advanced through a bore 11 by a conventional conveyor screw 12 and introduced into the grinding space through a central opening in the stationary disc 22. The bearing members 34, 36 are supported in bearing housing 32, which is provided with a cylindrical cavity between the two bearing members forming a pressure chamber 31, 33 on each side of a piston 30 which is fixed on the shaft 26 in a location so that it can rotate within the cylinder cavity between the chambers 31, 33. This piston is adjustable axially in response to the desired width of the grinding space defined between the two grinding discs.

Any axial displacement of the rotating piston 30 from its predetermined location corresponding to the selected interdisc spacing is constantly sensed by a position follower or slide shoe 40, which is maintained in frictional contact with the rear rotating surface of the piston 30 by the position indicator rod 42. The other end of the rod 42 is connected to a non-rotating piston 44 enclosed within the cylinder housing 46 and divides the cylinder cavity into chambers 46*a* and 46*b*. The position indicator rod 42 extends through the wall of cylinder housing 46 into contact with the means for regulating the supply of pressure medium, as will hereinafter be explained. A channel 43 extends through the rod 42 into the chamber 46*a* to connect the latter with the pressure chamber 31. Thus, the same oil pressure prevails in chamber 46*a* as in pressure chamber 31, forcing the glide shoe 40 into contact with the rotating surface of the piston 30.

The force applied by the rotating piston 30 on the rotating disc in a direction towards the stationary disc 22 is determined by means of a pressure medium supplied to the pressure chambers 31, 33. The supply of pressure medium to the pressure chambers is controlled by a conventional pilot valve, or spool valve, 52 fixed to the frame which is actuated by the position indicator rod 42 and slide shoe 40 in response to displacements of the rotating piston 30.

In this manner, the rotating piston 30 and the shaft 26 are automatically restored to their predetermined location in the cylinder cavity after momentary displacements caused by fluctuations in the axial thrust forces exerted on the shaft. It will be noted that t slightest axial movement of the piston 30 is transmitted immediately via glide shoe 40 and position indicator rod 42 to the pilot valve or sensor 52, which then calls for pressure medium to be directed to the respective pressure chambers 31 and 33 to generate a counter force to restore the piston 30 to its predetermined position in the cylinder cavity, which position corresponds to the interdisc spacing selected for the particular application of the grinding apparatus.

The predetermined location of the piston 30 in the cylinder cavity, and, consequently, the predetermined spacing between the grinding discs, is achieved by means of a set screw 60 which projects from the pilot valve 52. The nut 61 is screwed onto the set screw 60 and is provided with a knob which abuts the end of rod 42 The position of the nut 61 on set screw 60 can be adjusted by means of chain wheel 62 driven by a reversible electric motor 63 via chain drive 64. The motor 63 can be remotely controlled in known manner to set the spacing between the grinding discs. An example of such a remote control device is disclosed in U.S. Pat. No. 4,073,442 to Nils G. Virving, which has been referred to herein.

It should be understood that the adjustment of the nut can also be achieved manually. In either manner, the pre-set interspace clearance between the discs 22, 24 can be increased or reduced.

The pressure chambers 31 and 33 are supplied with a pressure medium, which, in the example shown, is oil of constant predetermined pressure which is pumped from the sump 55 by means of the pump 59 driven by the electromotor 50, through the pipe 58 into the conventional pilot valve or sensor 52, from which it is conducted through pipes 54 and 56 into the respective pressure chambers to provide a pressurized oil environment for the rotating piston 30.

It will follow from the foregoing description that any fluctuation in the pressure between the grinding discs which may occur, for example, by reason of accumulation of raw material in the grinding space or uneven wear of the grinding segments, will immediately be transmitted by the rotating piston 30 via glide shoe 40 and position indicator rod 42 to the pilot valve 52, which, in turn, will immediately adjust the pressure in the chambers 31 and 33, respectively, to produce a force on the piston which will instantaneously counteract any fluctuations in the thrust forces on the shaft and thus maintain the predetermined position of the rotating piston in the cylinder cavity and, consequently, the predetermined grinding clearance between the grinding discs.

The oil supplied to the pressure chambers 31 and 33 can be used to lubricate the bearings. The oil escaping from the bearings 34 and 36 is flung from the chambers 38 and 39 by conventional slinger rings 70 and 71 into conduit 53, from which it is drained back into the sump 55, where it is cooled for reuse by cooling coils 57.

In order to increase the volume of circulated oil with consequent reduced dwell time in the system and temperature rise, a valve 100 may be provided to drain a calculated amount of oil from chamber 33. A similar valve 101 may be installed to provide oil drainage also from chamber 31, if still greater oil circulation should be desired. These drainage valves may be used for lubricating the bearing by means of a separate oil flow.

Although the coefficient of friction is very small in a well-designed bearing system, some frictional heat still is generated. Unless this heat is dissipated, the lubricant oil will begin to decompose. It may, therefore, be desirable to surround the cylinder cavity with a cooling coil through which a cooling fluid is circulated from the inlet 110 to the outlet 112, in order to maintain a proper heat balance in the bearing system.

The unexpected and unobvious result emanating from the invention is believed to reside in the fact that the rotating piston generates a centrifugal force which increases the pressure in the hydraulic fluid progressively in the radial direction toward the periphery of the piston. This progressively increasing hydrodynamic pressure is in addition to the hydrostatic pressure in the liquid, and it provides stability against unbalanced forces acting on the rotating grinding discs, for example, when pulp material is unevenly distributed in the grinding space or when fiber bundles or chunks of wood become plugged therein, or when the grinding segments have worn down unevenly.

Another unobvious advantage resulting from the invention is the effective stiffening of the rotating shaft that may be attributed to the rotating piston which provides stability in its rotational plane. Thus, for instance, an eccentric loading of the rotating grinding disc tends to bend the shaft. This tendency is resisted by the hydraulic fluid rotating with the piston around its perimeter, which fluid is squeezed into the narrow gap between the piston periphery and the cylinder wall, thus wedging the piston in its vertical plane of rotation.

Figure 5:
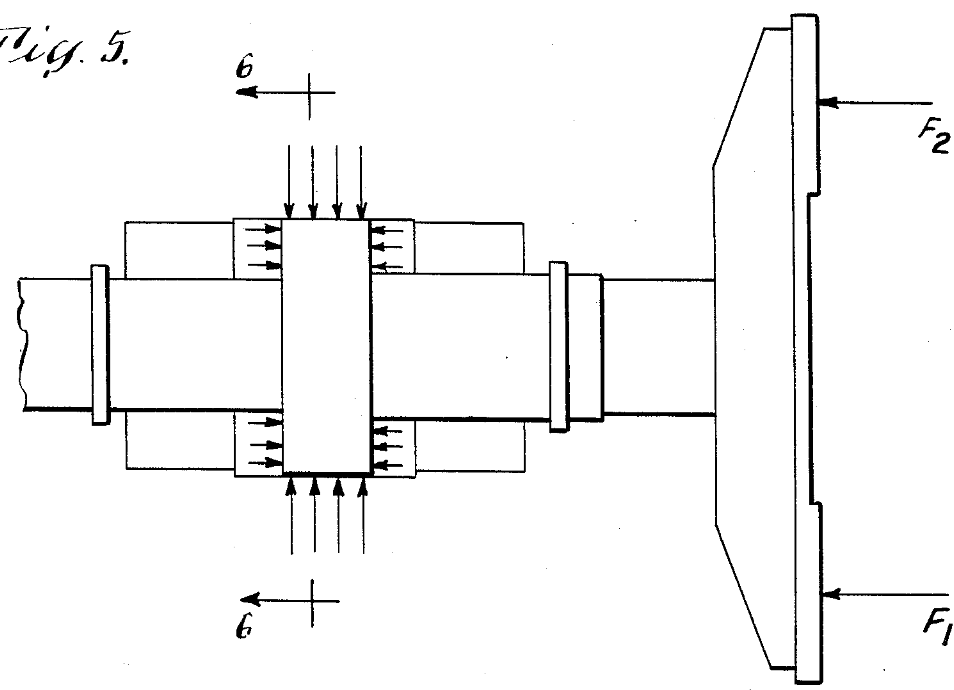
FIG. 5 is a schematic view showing the pressure forces acting on the rotating piston.
Figure 6:
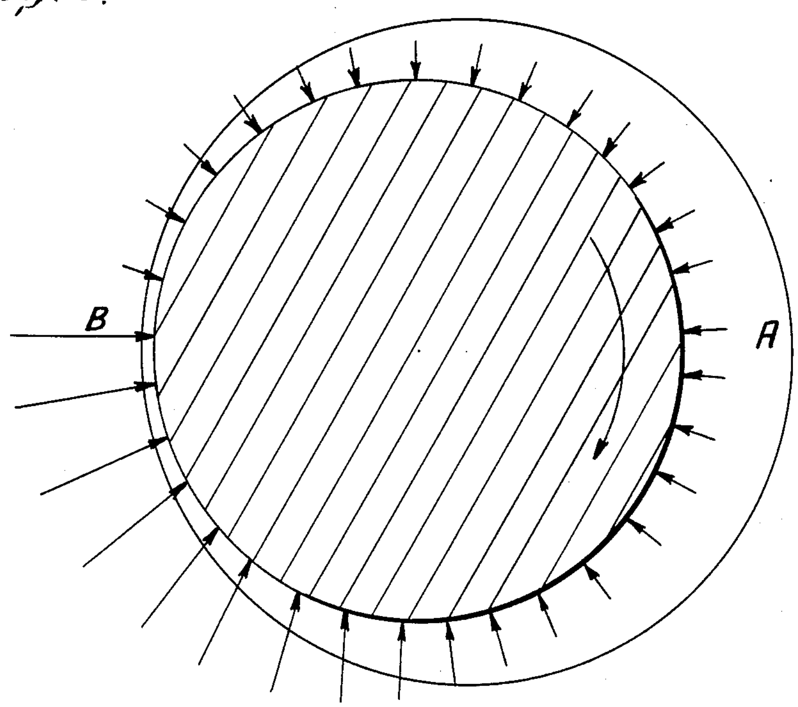
FIG. 6 is a schematic view of a crosssection taken along the line VI—VI of FIG. 5.

This self-generated wedge effect is illustrated by FIGS. 5 and 6. The progressively increasing hydrodynamic force is shown by the arrows in FIG. 5 which counteract the forces $F^1$ and $F^2$ exerted on the grinding discs. FIG. 6 illustrates how the oil rotating with the end surface of the piston will be squeezed out in a radial direction when travelling from A to B, thus further increasing the pressure at B and which pressure tends to force the shaft back to its center of rotation, thus counteracting the deflective thrust forces. The effect may be compared with the phenomenon of aquaplaning.

The application of the self-generated hydrodynamic pressure combined with the externally applied pressure, or hydrostatic pressure, to the rotating piston, results in a bearing system sufficient to support the heavy loads on the shaft, without the need of multiple thrust bearings and associated servo motors as has been the practice heretofore. This startling discovery constitutes a great advancement in the art, with consequent savings in cost of manufacture, maintenance and operation.

Figure 4:
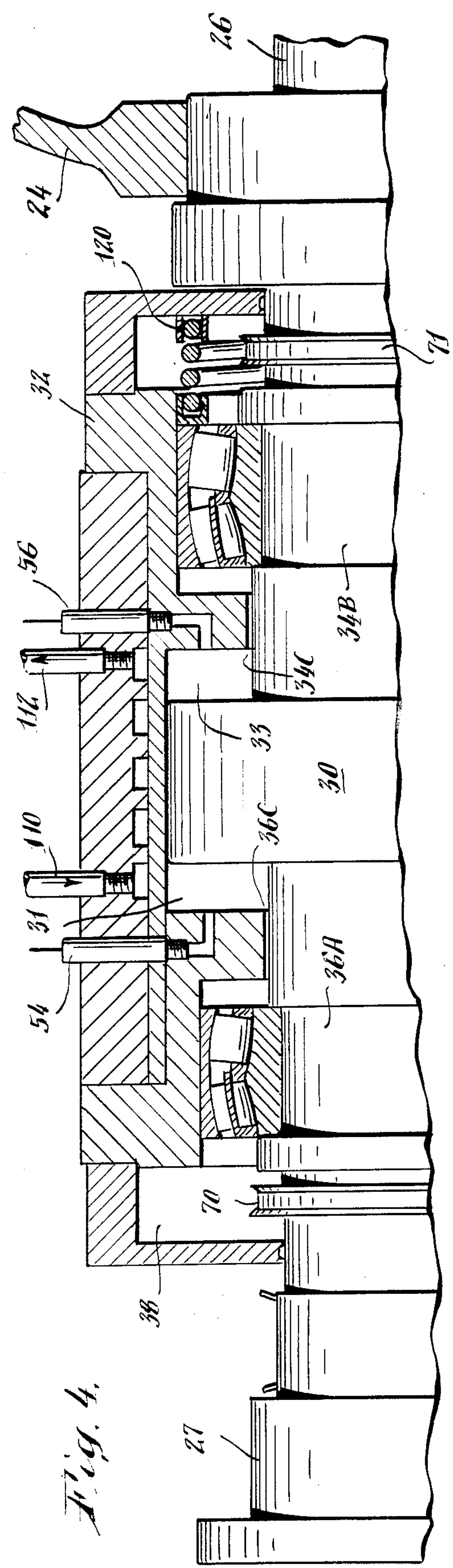
FIG. 3 and FIG. 4 are cross-sectional views similar to FIG. 2, showing two modifications.
Figure 3:
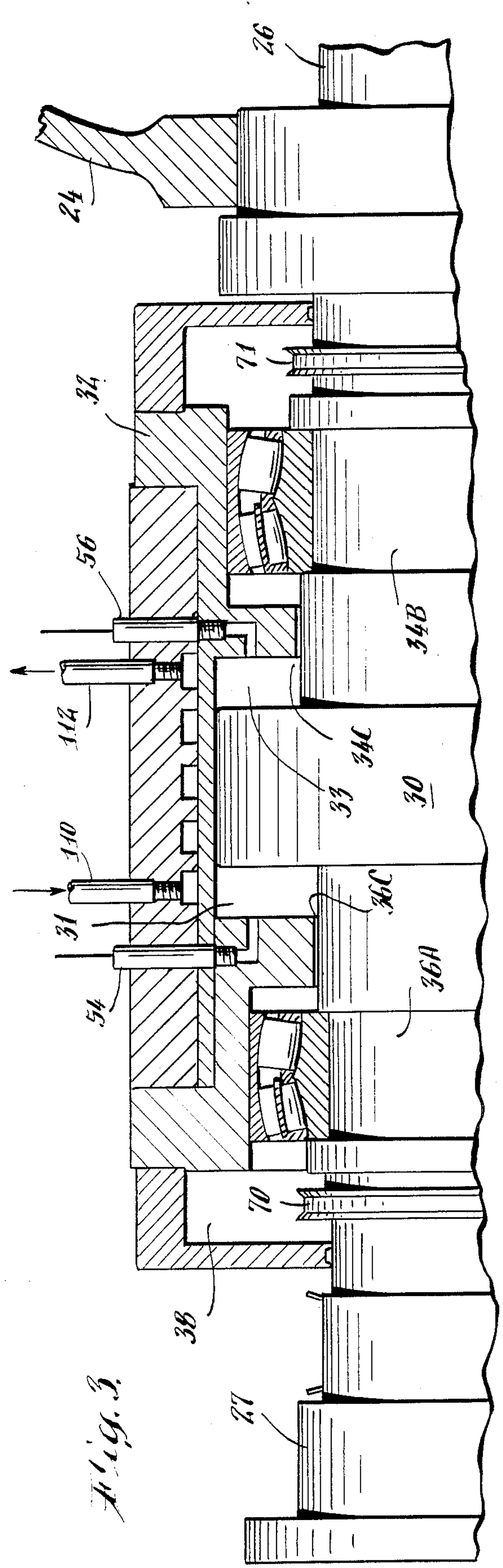

The inventive concept described herein applies also to the embodiment shown in FIGS. 3 and 4 and in the schematic views 7–10.

Figure 2:
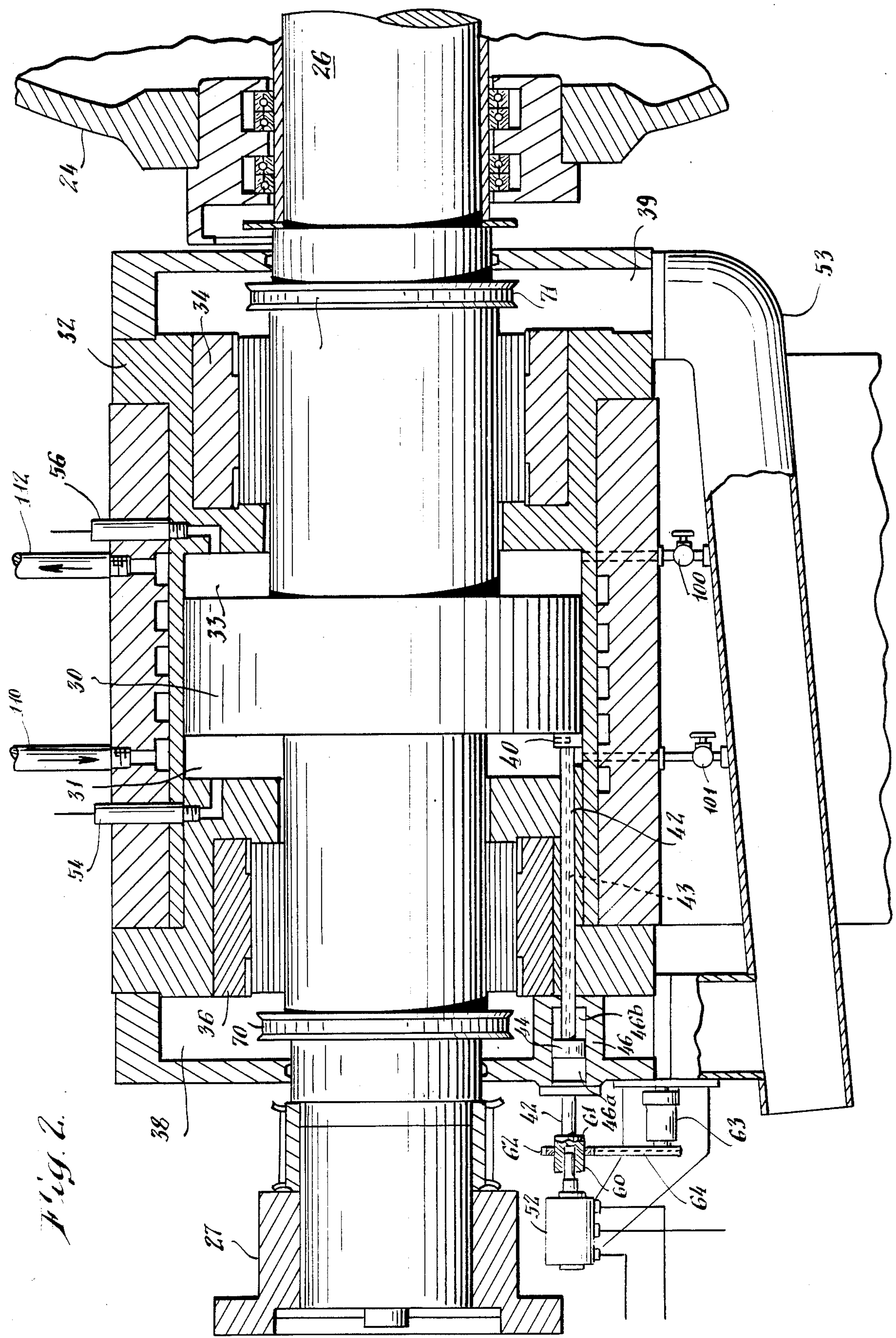
FIG. 2 is a fractional cross-sectional view of the apparatus shown in FIG. 1, drawn to an enlarged scale.

In the embodiment shown in FIG. 3, the slider bearings 34 and 36 in FIG. 2 have been replaced by conventional roller, bearings or axially displaceable radial roller bearings 36A and 36B. These bearings may also be lubricated by the oil in the pressure chambers, which flows through the narrow gaps 34c and 36c, respectively, which gaps provide a radial play on the order of 2/100 mm. to 10/100 mm. The great resistance developed in the gaps, however, is sufficient the predetermined oil pressure in the pressure chambers 31 and 33.

In some applications of the invention, oil pressure may be maintained only in pressure chamber 31, while oil passing through the narrow gap between the rotating piston and the cylinder into chamber 33 is drained through the valve 100 and returned to the oil sump 55.

In order to maintain the piston in the predetermined position when no oil pressure is maintained in chamber 33 against the oil pressure in pressure chamber 31, and when no axial loads are exerted on the shaft 26, a preloaded spring 120 may be mounted between the end cover of the bearing housing and the axially displaceable roller bearing 34b to counteract the axially directed thrust forces and the forces generated by the rotational movement of the oil in the pressure chamber 31. This arrangement allows the shaft 26 to be displaced axially also, when no axial external loads are exerted thereon merely by adjusting the oil pressure in pressure chamber 31. Without departing from the invention, an air pressure cushion may be provided in chamber 33, in place of the spring 120.

Figure 7:
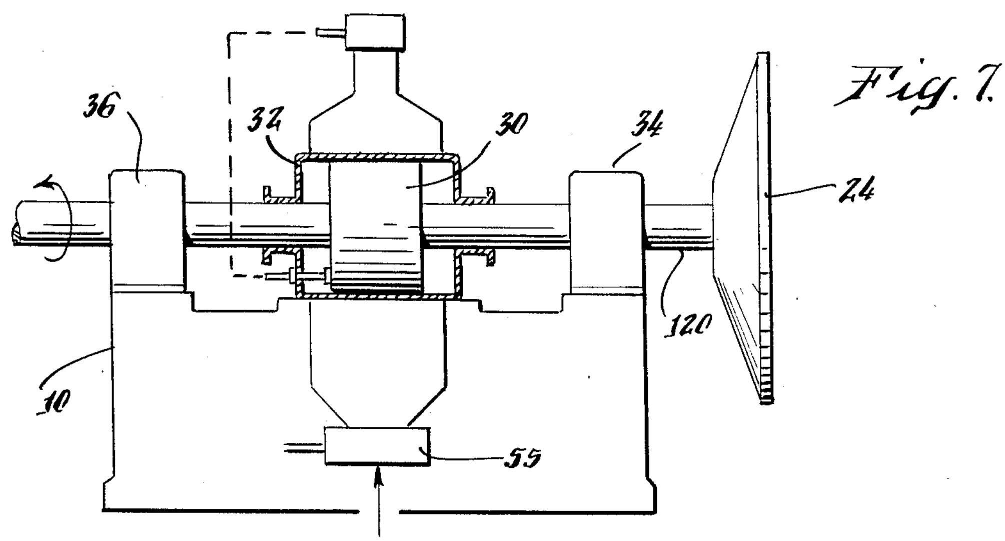
FIGS. 7, 8, 9 and 10 are schematic views showing different applications of the invention.
Figure 8:
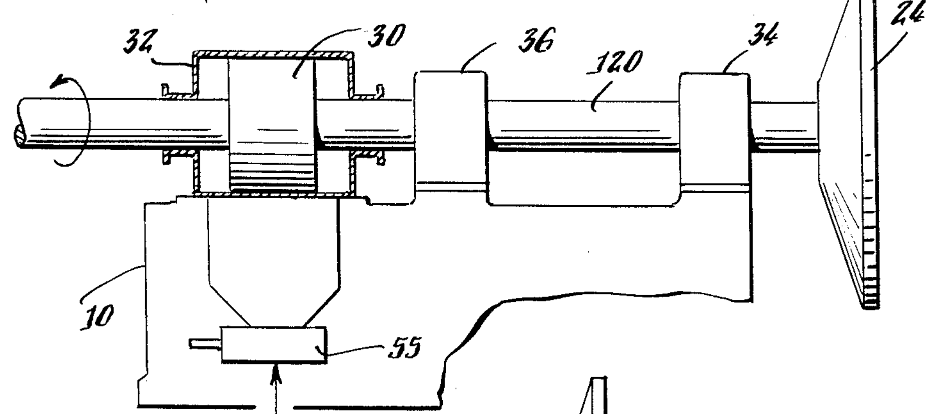

In the schematically illustrated application of the invention, FIG. 7 shows a separate conventional radial bearing supporting the shaft 120 at each side of the combined hydrostatic/hydrodynamic bearing system according to the invention. FIG. 8 shows an arrangement where two conventional radial bearings support the shaft between the rotating grinding disc and the combined hydrostatic/hydrodynamic bearing system according to the invention.

Figure 9:
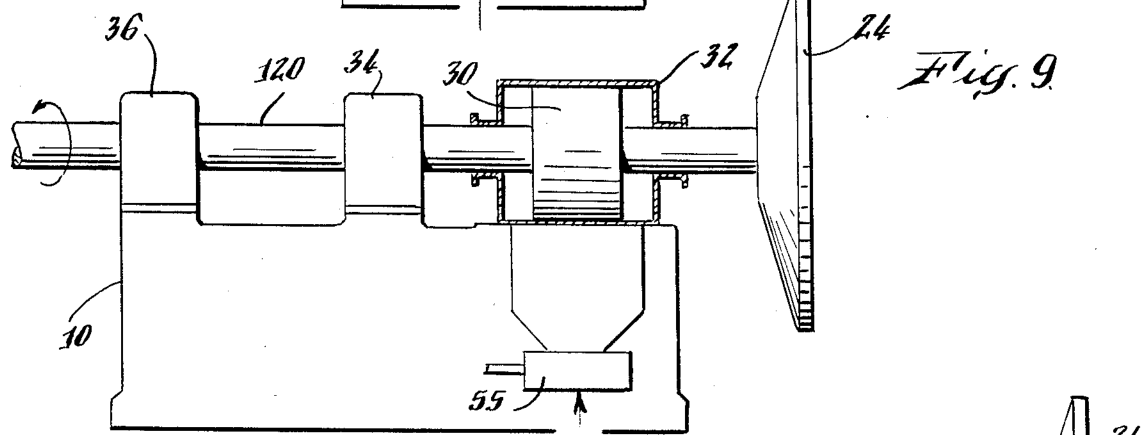

FIG. 9 shows an arrangement where the combined hydrostatic/ hydrodynamic bearing system according to the invention is located between the radial bearings and the grinding disc.

Figure 10:
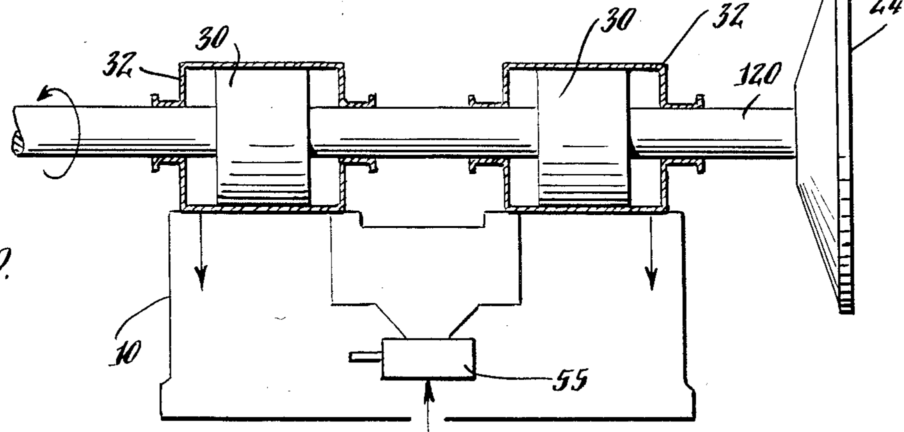

FIG. 10 shows schematically an arrangement in which two combined hydrostatic/hydrodynamic bearing systems according to the invention are arranged in series on the shaft in which the two rotating pistons 30 rotating within their respective cylinder housings 32 act as thrust bearings as well as radial bearings.

Figure 11:
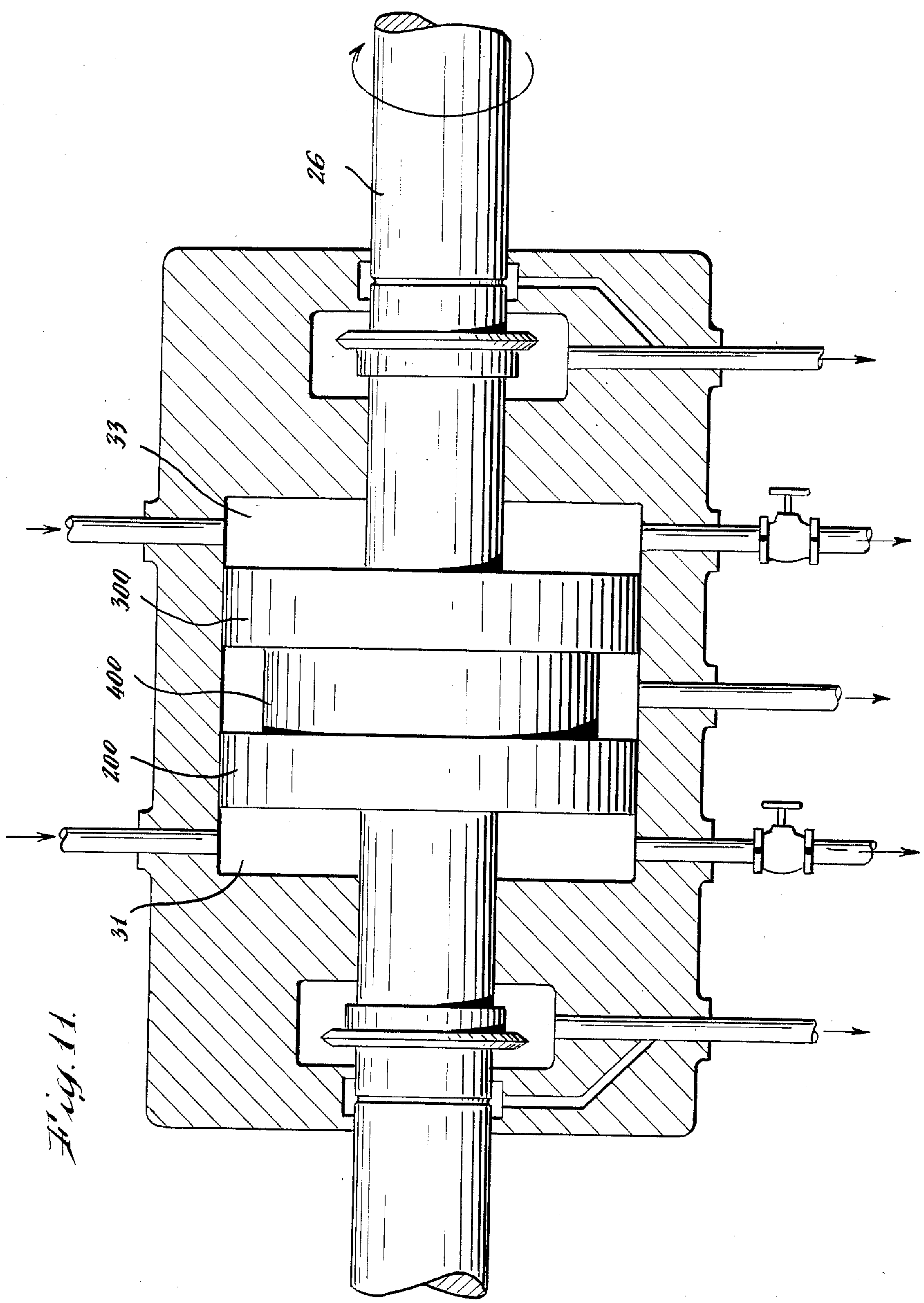
FIG. 11 is a cross-sectional view of still another modification.

FIG. 11 shows a modification in which the rotating piston is divided into two sections 200 and 300 with an intervening space 400 for draining the oil being squeezed through the gap between the piston and the cylinder. This modification insures the maintenance of constant oil flow in the gap between the piston and the cylinder, even if the oil pressure in chambers 31 and 33 should be under substantially the same pressure, as, for example, when the shaft is not subjected to any axial loads, such as when the apparatus is idling.

It should be understood that the diameter of the shaft 26 may differ in size between the drive side and the disc side, resulting in different piston end areas on the two sides. Such difference, however, will have no effect on the function of the apparatus, since the combination of axial load and piston end areas always produces the same oil pressure on the opposed piston ends at a certain axial load sufficient to maintain the oil flow in the gap between the piston and the cylinder.

Lubrication and cooling of the pistons may also be insured by supplying oil of higher pressure to the space 400 than that prevailing in the chambers 31, 33.

It should be understood that the invention may be expressed in a variety of forms of application, in addition to the ones disclosed and illustrated herein.

What I claim as my invention:

1. In a pulp refining apparatus in which the pulp raw material is ground in a grinding space defined between at least one pair of relatively rotating grinding members and in which at least one of said grinding members is carried by an axially displaceable rotatable shaft, a bearing system comprising combined hydrostatic/hydrodynamic (a) at least one rotatable piston defined between two opposed pistons ends mounted on said rotatable shaft to rotate therewith (b) at least one cylindrical housing defining at least one pressure chamber circumferentially surrounding said at least one cylindrical piston permitting the same to move axially in said pressure chamber;

(c) means for applying a hydrostatic stabilizing force on said shaft in an axial direction by supplying a fluid pressure medium to at least one of said piston ends to continuously counteract fluctuating axial thrust forces exerted on said shaft during the grinding operation to thereby maintain a predetermined clearance range of said grinding space with consequent generation of fluctuating pressure differentials between said opposed piston ends; and (d) means for generating a hydrodynamic stabilizing force on said rotating shaft in a radial direction comprising passage means allowing said pressure medium to flow under pressure between said opposed piston ends in said at least one pressure chamber by the effect of said pressure differentials and the effect of the centrifugal force imparted to said fluid pressure medium by the rotation of said at least one cylindrical piston within said at least one pressure chamber.

2. A combined hydrostatic/hydrodynamic bearing system according to claim 1, in which said rotatable shaft is rotatably supported by said at least one cylindrical piston.

3. A combined hydrostatic/hydrodynamic bearing system according to claim 1, in which said rotatable shaft is additionally supported by radial bearing means.

4. A combined hydrostatic/hydrodynamic bearing system according to claim 3, in which said radial bearing means comprises at least one radial bearing spaced from said cylindrical housing.

5. A combined hydrostatic/hydrodynamic bearing system according to claim 1, in which said at least one cylindrical housing additionally comprises axially displaceable radial bearing means for rotatably supporting said rotatable shaft.

6. A combined hydrostatic/hydrodynamic bearing system according to claims 1 or 5, in which said rotatable shaft is supported by at least two cylindrical housings spaced from one another along Said rotatable shaft;

7. A combined hydrostatic/hydrodynamic bearing system according to claim 1, in which said cylindrical housing defines a pair of opposed pressure chambers separated from one another by said cylindrical piston and in which said fluid pressure means is supplied to at least one of said chambers;

8. A combined hydrostatic/hydrodynamic bearing system according to claim 7, in which said fluid pressure means in one of said opposed pressure chambers is counteracted by spring means mounted in said cylindrical housing to apply counteracting pressure.

9. A combined hydrostatic/hydrodynamic bearing system accordinging to claim 1, in which said fluid pressure medium is applied to at least one of said piston ends in a controlled manner by valve means actuated by shaft position indicator means.

10. A combined hydrostatic/hydrodynamic bearing system according to claim 9, in which said fluid pressure medium comprises oil which is circulated between a source of supply and said at least one pressure chamber.

11. A combined hydrostatic/hydrodynamic bearing system according to claim 1, in which the means for controlling the application of pressure medium to at least one of said rotating piston ends and to adjust the pressure in said at least one pressure chamber to counteract fluctuating axial thrust forces acting on said rotatable shaft includes valve means and at least one piston position indicator rod actuated by one of said pistons to transmit to said valve means any movements of said at least one rotating piston occasioned by fluctuation in pressure between said grinding discs.

12. A combined hydrostatic/hydrodynamic bearing system according to claim 11, in which said position indicator rod carries at least one non-rotatable piston which is axially displaceable in a stationary cylindrical housing defining a pressure chamber closely surrounding said non-rotating piston, said piston indicator rod being surrounded by channel means establishing communication between said at least one pressure chamber and said non-rotatable piston to thereby transmit to said valve means any movement of said at least one rotating piston.

13. A combined hydrostatic/hydrodynamic bearing system according to claims 1, 12 or 11, in which said at least one piston has an annular recess between said opposed piston ends.

14. A bearing system according to claim 1, in which said at least one cylindrical piston rotates in a hydraulic fluid pressure medium.

15. A bearing system according to claim 1, in which said shaft and said at least one cylindrical piston rotate at a speed of at least 1500 r.p.m.

16. A bearing system according to claims 1, or 15, in which said relatively rotating grinding members have a diameter of at least 150 centimeters.

17. A bearing system according to claims 1, 15 or 16, in which said passage means for allowing said fluid pressure medium to flow under pressure between said opposed piston ends comprises a gap defined between said cylindrical housing and said cylindrical piston.

* * * * *